US012406634B1

(12) United States Patent
Ahn

(10) Patent No.: US 12,406,634 B1
(45) Date of Patent: Sep. 2, 2025

(54) DISPLAY DEVICE AND OPERATING METHOD THEREOF

(71) Applicant: LG ELECTRONICS INC., Seoul (KR)

(72) Inventor: Sanghyuk Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/657,577

(22) Filed: May 7, 2024

(30) Foreign Application Priority Data

Apr. 4, 2024 (KR) ........................ 10-2024-0045737

(51) Int. Cl.
*G09G 3/36* (2006.01)

(52) U.S. Cl.
CPC ......... *G09G 3/3614* (2013.01); *G09G 3/3688* (2013.01); *G09G 2300/0842* (2013.01); *G09G 2320/0233* (2013.01); *G09G 2320/0247* (2013.01); *G09G 2320/0257* (2013.01); *G09G 2330/021* (2013.01)

(58) Field of Classification Search
CPC ........................... G09G 3/3655; G09G 3/3614
See application file for complete search history.

(56) References Cited

U.S. PATENT DOCUMENTS

2005/0259061 A1* 11/2005 Aoki .................... G09G 3/3688 345/96
2007/0024560 A1* 2/2007 Kim ..................... G09G 3/3655 345/94
2010/0033413 A1* 2/2010 Song .................... G09G 3/3655 345/89
2010/0085336 A1* 4/2010 Yang .................... G09G 3/3614 345/205
2013/0002145 A1 1/2013 Hwang et al.
2013/0162697 A1 6/2013 Kobayashi et al.
2015/0187291 A1 7/2015 Jang
2016/0093260 A1* 3/2016 Watsuda ............. G09G 3/3611 345/87

(Continued)

FOREIGN PATENT DOCUMENTS

KR 1020050039427 4/2005
KR 1020130036661 4/2013

(Continued)

OTHER PUBLICATIONS

KR20170064387A Liquid crystal display device and driving method thereof (Year: 2015).*

(Continued)

*Primary Examiner* — Van N Chow
(74) *Attorney, Agent, or Firm* — LEE, HONG, DEGERMAN, KANG & WAIMEY

(57) ABSTRACT

A device display device according to an embodiment of the present disclosure, comprises a Liquid Crystal Display (LCD) panel and a control unit configured to compare an initial common voltage level of RGB data applied to the LCD panel with a common voltage level obtained after the initial common voltage level, and when the common voltage level is changed more than a certain ratio compared to the initial common voltage level, adjust a voltage level of the RGB data applied to two frames at a time of a polarity toggle operation to invert the polarity of the voltage level of the RGB data.

15 Claims, 13 Drawing Sheets

(56) References Cited

U.S. PATENT DOCUMENTS

| | | | | |
|---|---|---|---|---|
| 2018/0056187 | A1* | 3/2018 | Ahn | A63F 13/86 |
| 2018/0056190 | A1* | 3/2018 | Ahn | G06Q 30/0272 |
| 2021/0118383 | A1 | 4/2021 | Zhang | |
| 2021/0295790 | A1 | 9/2021 | Zhang | |

FOREIGN PATENT DOCUMENTS

| | | |
|---|---|---|
| KR | 1020140134513 | 11/2014 |
| KR | 1020150073702 | 7/2015 |

OTHER PUBLICATIONS

European Patent Office Application Serial No. 24172924.3, Search Report dated Oct. 24, 2024, 14 pages.
Korean Intellectual Property Office Application No. 10-2024-0045737, Office Action dated Nov. 22, 2024, 6 pages.

* cited by examiner

FIG. 11

1100

| When the luminance difference value between N−2 and N−1 frames is 50 nit or more (1110) | | | When the luminance difference value between N−2 and N−1 frames is 100 nit or more (1130) | | | When the luminance difference value between N−2 and N−1 frames is 200 nit or more (1150) | | |
|---|---|---|---|---|---|---|---|---|
| R/G/B Data | Gain | Offset | R/G/B Data | Gain | Offset | R/G/B Data | Gain | Offset |
| 0~15lv | 5Lv | | 0~15lv | 6Lv | | 0~15lv | 7Lv | |
| 16~31lv | 5Lv | | 16~31lv | 6Lv | | 16~31lv | 7Lv | |
| 31~47lv | 5Lv | | 31~47lv | 6Lv | | 31~47lv | 7Lv | |
| 48~63lv | 5Lv | | 48~63lv | 6Lv | | 48~63lv | 7Lv | |
| 64~79lv | 6Lv | | 64~79lv | 7Lv | | 64~79lv | 8Lv | |
| 80~95lv | 6Lv | | 80~95lv | 7Lv | | 80~95lv | 8Lv | |
| 96~111lv | 6Lv | | 96~111lv | 7Lv | | 96~111lv | 8Lv | |
| 112~127lv | 6Lv | | 112~127lv | 7Lv | | 112~127lv | 8Lv | |
| 128~143lv | | 7Lv | 128~143lv | | 8Lv | 128~143lv | | 9Lv |
| 144~159lv | | 7Lv | 144~159lv | | 8Lv | 144~159lv | | 9Lv |
| 160~175lv | | 7Lv | 160~175lv | | 8Lv | 160~175lv | | 9Lv |
| 176~191lv | | 7Lv | 176~191lv | | 8Lv | 176~191lv | | 9Lv |
| 192~207lv | | 8Lv | 192~207lv | | 9Lv | 192~207lv | | 10Lv |
| 208~223lv | | 8Lv | 208~223lv | | 9Lv | 208~223lv | | 10Lv |
| 224~239lv | | 8Lv | 224~239lv | | 9Lv | 224~239lv | | 10Lv |
| 240~255lv | | 8Lv | 240~255lv | | 9Lv | 240~255lv | | 10Lv |

DISPLAY DEVICE AND OPERATING METHOD THEREOF

CROSS-REFERENCE TO RELATED APPLICATION

Pursuant to 35 U.S.C. § 119(a), this application claims the benefit of earlier filing date and right of priority to Korean Patent Application No. 10-2024-0045737, filed on Apr. 4, 2024, the contents of which are all hereby incorporated by reference herein in its entirety.

BACKGROUND OF THE INVENTION

1. Field of the Invention

The present disclosure relates to a display device and a method of operating thereof, and more specifically, to a method of improving flicker generated in a liquid crystal display panel.

2. Discussion of the Related Art

Liquid crystal display (LCD) may be miniaturized compared to cathode ray tube (CRT), so it is applied to display device such as portable information device, office equipment, and computer, and is also applied to television to quickly to replace cathode ray tube.

Transmissive liquid crystal display, which make up the majority of liquid crystal display, display image by controlling the electric field applied to the liquid crystal layer and modulating light incident from the backlight unit.

Recently, flicker field claim due to polarity toggle of 4K or 8K LCD TV continue to occur.

In liquid crystal display panel, flicker is improved by applying a polarity toggle that inverts a positive voltage pattern and a negative voltage pattern to improve the problem of afterimage that occur in a logo of a fixed position or in a specific boundary.

However, when polarity is toggled, a problem occurs in which flicker occurs momentarily for two frames.

SUMMARY OF THE INVENTION

The purpose of the present disclosure is to improve flicker that occurs during a polarity toggle operation performed to eliminate an occurrence of a shift in a common voltage in a LCD panel.

The purpose of the present disclosure is to prevent sudden change in luminance that occur during a polarity toggle operation in order to eliminate an occurrence of a shift in a common voltage in a LCD panel.

A device display device according to an embodiment of the present disclosure, comprises a Liquid Crystal Display (LCD) panel and a control unit configured to compare an initial common voltage level of RGB data applied to the LCD panel with a common voltage level obtained after the initial common voltage level, and when the common voltage level is changed more than a certain ratio compared to the initial common voltage level, adjust a voltage level of the RGB data applied to two frames at a time of a polarity toggle operation to invert the polarity of the voltage level of the RGB data.

A method of operating of a display device according to an embodiment of the present disclosure, comparing an initial common voltage level of RGB data applied to the LCD panel with a common voltage level obtained after the initial common voltage level, and when the common voltage level is changed more than a certain ratio compared to the initial common voltage level, adjusting a voltage level of the RGB data applied to two frames at a time of a polarity toggle operation to invert the polarity of the voltage level of the RGB data.

According to the present disclosure, a flicker generated during a polarity toggle operation performed to eliminate the occurrence of a shift in the common voltage in an LCD panel may be improved.

The present disclosure may prevent sudden change in luminance that occur during a polarity toggle operation performed to eliminate shift in common voltage in an LCD panel.

Accordingly, even if there is a logo image or a border image fixed on the screen, flicker is suppressed and the user may watch the video naturally.

BRIEF DESCRIPTION OF THE DRAWINGS

FIG. 11 is a diagram illustrating a lookup table that corresponds to a luminance difference value and a gain value/offset value of a voltage level of RGB data according to an embodiment of the present disclosure.

DETAILED DESCRIPTION OF THE PREFERRED EMBODIMENTS

Hereinafter, the present specification will be described in more detail with reference to the drawings.

The suffixes "module" and "part" for components used in the following description are simply given in consideration of the ease of writing this specification, and do not in themselves give any particularly important meaning or role. Accordingly, the terms "module" and "unit" may be used interchangeably.

Terms containing ordinal numbers, such as first, second, etc., may be used to describe various components, but the components are not limited by the terms. The above terms are used only for the purpose of distinguishing one component from another.

Singular expression includes plural expressions unless the context clearly dictates otherwise.

In this application, terms such as "comprise" or "have" are intended to designate the presence of features, numbers, steps, operations, components, parts, or combinations thereof described in the specification, but are not intended to indicate the presence of one or more other features and it should be understood that this does not exclude in advance the possibility of the existence or addition of elements, numbers, steps, operations, components, parts, or combinations thereof.

Figure 1:
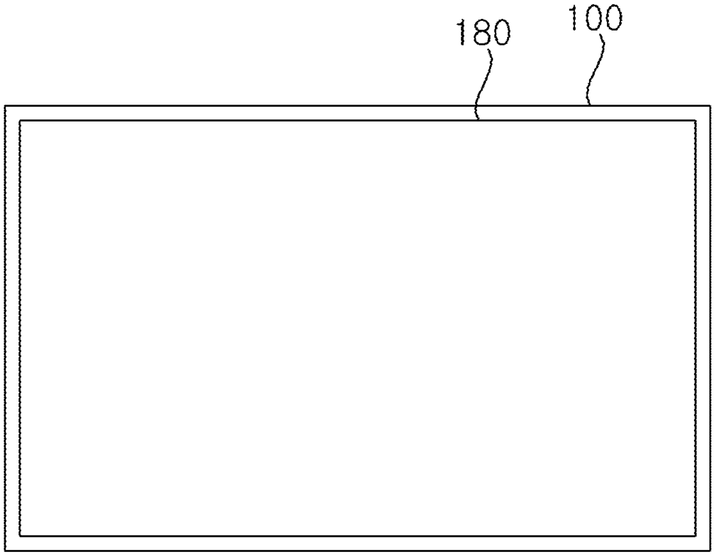
FIG. 1 is a diagram illustrating a display device according to an embodiment of the present invention.

FIG. 1 is a diagram illustrating a display device according to an embodiment of the present disclosure.

Referring to the drawings, the display device 100 may include a display unit 180.

Meanwhile, the display unit 180 may be implemented as any one of various panels.

In the present disclosure, the display unit 180 is provided with a liquid crystal display panel (LCD panel). Hereinafter, the display device 100 may be a liquid crystal display.

Meanwhile, the display device 100 of FIG. 1 may be a monitor, TV, tablet PC, mobile terminal, etc.

Figure 2:
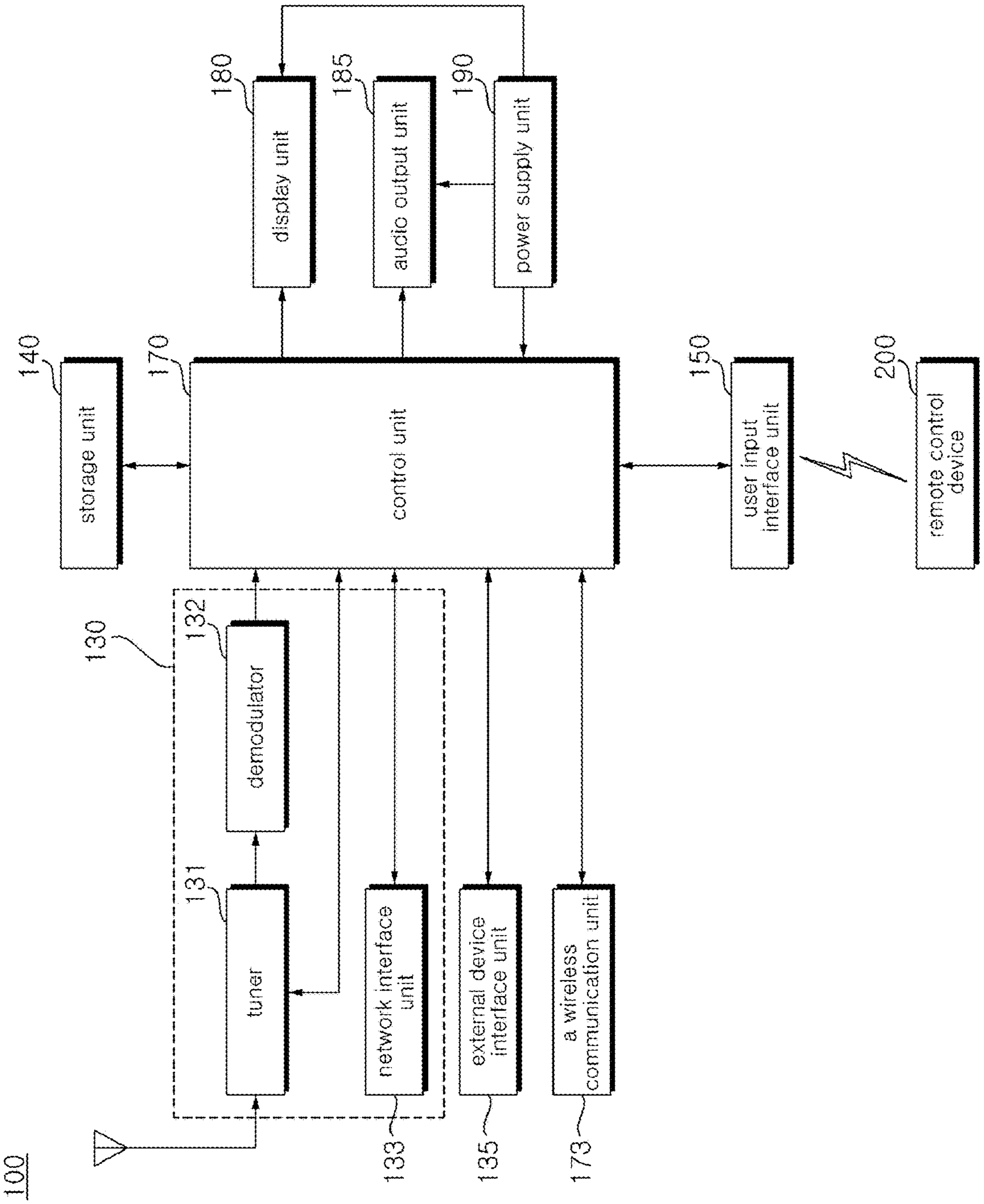
FIG. 2 is an example of a block diagram of the inside of the display device in FIG. 1.

FIG. 2 is a block diagram showing the configuration of the display device of FIG. 1.

Referring to FIG. 2, the display device 100 may include a broadcast reception unit 130, an external device interface unit 135, a storage unit 140, a user input interface unit 150, a control unit 170, and a wireless communication unit 173, a display unit 180, an audio output unit 185, and a power supply unit 190.

The broadcast reception unit 130 may include a tuner 131, a demodulator 132, and a network interface unit 133.

The tuner 131 may select a specific broadcast channel according to a channel selection command. The tuner 131 may receive a broadcast signal for a specific selected broadcast channel.

The demodulator 132 may separate the received broadcast signal into a video signal, an audio signal, and a data signal related to the broadcast program, and may restore the separated video signal, audio signal, and data signal to a form that may be output.

The network interface unit 133 may provide an interface for connecting the display device 100 to a wired/wireless network including an Internet network.

The external device interface unit 135 may receive an application or application list in an adjacent external device and transmit it to the control unit 170 or the storage unit 140.

The external device interface unit 135 may provide a connection path between the display device 100 and an external device. The external device interface unit 135 may receive one or more of video and audio output from an external device connected wirelessly or wired to the display device 100 and transmit it to the control unit 170.

The external device interface unit 135 may include a plurality of external input terminals. The plurality of external input terminals may include an RGB terminal, one or more High Definition Multimedia Interface (HDMI) terminals, and a component terminal.

An image signal from an external device input through the external device interface unit 135 may be output through the display unit 180. A audio signal from an external device input through the external device interface unit 135 may be output through the audio output unit 185.

An external device that may be connected to the external device interface unit 135 may be any one of a set-top box, Blu-ray player, DVD player, game console, sound bar, smartphone, PC, USB memory, or home theater, but this is only an example.

The storage unit 140 stores program for processing and controlling each signal in the control unit 170, and may store signal-processed video, audio, or data signal.

The storage unit 140 may perform a function for temporarily storing video, voice, or data signal input from the external device interface unit 135 or the network interface unit 133, and may store information about a predetermined image through a channel memory function.

The user input interface unit 150 may transmit a signal input by the user to the control unit 170 or transmit a signal from the control unit 170 to the user. For example, the user input interface unit 150 may receive a control signal for a power on/off, a channel selection, and a screen setting to process according to various communication methods such as Bluetooth, Ultra Wideband (WB), ZigBee, Radio Frequency (RF) communication, or infrared (IR) communication from the remote control device 200, or may process a control signal from the control unit 170 may be transmitted to the remote control device 200.

Additionally, the user input interface unit 150 may transmit a control signal input from local keys (not shown) such as power key, channel key, volume key, and setting value to the control unit 170.

The image signal processed by the control unit 170 may be input to the display unit 180 and displayed as an image corresponding to the image signal. Additionally, the image signal processed by the control unit 170 may be input to an external output device through the external device interface unit 135.

The audio signal processed by the control unit 170 may be output as audio to the audio output unit 185. Additionally, the audio signal processed by the control unit 170 may be input to an external output device through the external device interface unit 135.

In addition, the control unit 170 may control overall operations within the display device 100.

The control unit 170 may control the image signal or the audio signal from an external device, for example, a camera or camcorder, input through the external device interface unit 135 according to an external device image playback command received through the user input interface unit 150 to be output through the display unit 180 or the audio output unit 185.

Meanwhile, the control unit 170 may control the display unit 180 to display an image, for example, a broadcast image input through the tuner 131, or an external input input through the external device interface unit 135, an image input through the network interface unit, or an image stored in the storage unit 140 may be controlled to be displayed on the display unit 180. In this case, the image displayed on the display unit 180 may be a still image or a moving image, and may be a 2D image or 3D image.

The control unit 170 may control the playback of content stored in the display device 100, received broadcast content, or external input content, including broadcast video, external input video, audio file, and still image, connected web screen, and document file, etc.

The wireless communication unit 173 may communicate with external device through wired or wireless communication. The wireless communication unit 173 may perform short range communication with an external device.

For this purpose, the wireless communication unit 173 may support a short-range communication using at least one of Bluetooth™, BLE (Bluetooth Low Energy), RFID (Radio Frequency Identification), Infrared Data Association (IrDA), UWB (Ultra Wideband), ZigBee, NFC (Near Field Communication), Wi-Fi (Wireless-Fidelity) Wi-Fi Direct and Wireless USB (Wireless Universal Serial Bus) technology.

The display unit 180 may convert the video signal, data signal, and OSD signal processed by the control unit 170 or the video signal and data signal received from the external device interface unit 135 into R, G, and B signals, respectively, and generate a driving signal.

Meanwhile, the display device 100 shown in FIG. 2 is only an example of the present disclosure. Some of the illustrated components may be integrated, added, or omitted depending on the specification of the display device 100 that is actually implemented.

That is, as needed, two or more components may be combined into one component, or one component may be subdivided into two or more components.

Additionally, the functions performed in each block are for explaining embodiments of the present disclosure, and the specific operations or devices do not limit the scope of the present disclosure.

The audio output unit 185 receives the audio-processed signal from the control unit 170 and outputs it as audio.

The power supply unit 190 supplies the corresponding power throughout the display device 100. In particular, power may be supplied to the control unit 170, which may be implemented in the form of a system on chip (SOC), the display unit 180 for displaying image, and the audio output unit 185 for audio output.

Specifically, the power supply unit 190 may include a converter that converts alternating current power to direct current power and a dc/dc converter that converts the level of direct current power.

The remote control device 200 transmits user input to the user input interface unit 150.

For this purpose, the remote control device 200 may use Bluetooth, Radio Frequency (RF) communication, infrared (IR) communication, Ultra Wideband (UWB), ZigBee, etc. Additionally, the remote control device 200 may receive video, audio, or data signals output from the user input interface unit 150, and display them or output audio signals on the remote control device 200.

Figure 3:
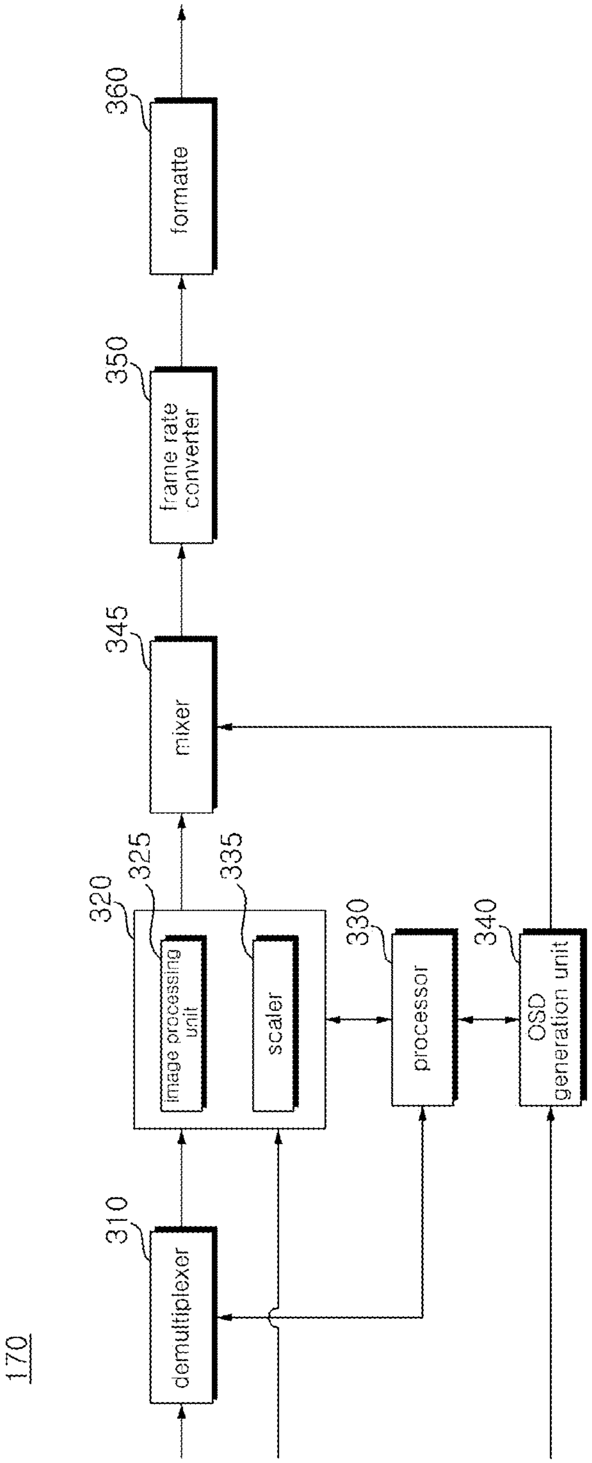
FIG. 3 is an example of a block diagram of the inside of a controller in FIG. 2.

FIG. 3 is an example of an internal block diagram of the control unit of FIG. 2.

When described with reference to the drawing, the control unit 170 according to an embodiment of the present disclosure may include a demultiplexer 310, an image processing unit 320, a processor 330, an OSD generation unit 340, and a mixer 345, a frame rate converter 350, and a formatter 360. In addition, it may further include an audio processing unit (not shown) and a data processing unit (not shown).

The demultiplexer 310 demultiplexes the input stream. For example, when MPEG-2 TS is input, it may be demultiplexed and separated into video, voice, and data signals. Here, the stream signal input to the demultiplexer 310 may be a stream signal output from the tuner unit 110, the demodulator 120, or the external device interface unit 130.

The image processing unit 320 may perform image processing of demultiplexed video signal. For this purpose, the image processing unit 320 may include an video decoder 325 and a scaler 335.

The video decoder 325 decodes the demultiplexed video signal, and the scaler 335 performs scaling so that the resolution of the decoded video signal may be output on the display unit 180.

The video decoder 325 may be equipped with decoder of various standards. For example, an MPEG-2, H,264 decoder, a 3D video decoder for color image and depth image, a decoder for multiple viewpoint images, etc. may be provided.

The processor 330 may control overall operations within the display device 100 or the control unit 170. For example, the processor 330 may control the tuner 110 to select (tuning) an RF broadcast corresponding to a channel selected by the user or a pre-stored channel.

Additionally, the processor 330 may control the display device 100 by a user command or internal program input through the user input interface unit 150.

Additionally, the processor 330 may perform data transmission control with the network interface unit 135 or the external device interface unit 130.

Additionally, the processor 330 may control the operations of the demultiplexer 310, the image processing unit 320, and the OSD generation unit 340 within the control unit 170.

The OSD generation unit 340 generates an OSD signal according to user input or by itself. For example, based on a user input signal, a signal may be generated to display various information in graphic or text on the screen of the display unit 180. The generated OSD signal may include various data such as a user interface screen of the display device 100, various menu screen, widget, and icon. Additionally, the generated OSD signal may include 2D object or 3D object.

Additionally, the OSD generation unit 340 may generate a pointer that may be displayed on the display unit 180 based on the pointing signal input from the remote control device 200. In particular, such a pointer may be generated in a pointing signal processor, and the OSD generation unit 340 may include such a pointing signal processor (not shown). Of course, it is also possible that the pointing signal processor (not shown) is provided separately rather than within the OSD generation unit 340.

The mixer 345 may mix the OSD signal generated by the OSD generation unit 340 and the decoded video signal processed by the image processing unit 320. The mixed video signal is provided to the frame rate converter 350.

The frame rate converter (FRC) 350 may convert the frame rate of the input video. Meanwhile, the frame rate converter 350 is also capable of outputting the video as is without separate frame rate conversion.

Meanwhile, the formatter 360 may change the format of an input video signal into a video signal for display on a display and output it.

The formatter 360 may change the format of the video signal. For example, the format of the 3D video signal may be changed to any one of various 3D formats such as Side by Side format, Top/Down format, Frame Sequential format, Interlaced format, Checker Box format.

Meanwhile, the audio processing unit (not shown) in the control unit 170 may perform audio processing of the demultiplexed audio signal. For this purpose, the audio processing unit (not shown) may be equipped with various decoders.

Additionally, the audio processing unit (not shown) within the control unit 170 may process bass, treble, and volume control.

The data processing unit (not shown) within the control unit 170 may perform data processing of the demultiplexed data signal. For example, if the demultiplexed data signal is an encoded data signal, it may be decoded. The encoded data signal may be electronic program guide information including broadcast information such as the start time and end time of the broadcast program aired on each channel.

Meanwhile, the block diagram of the control unit 170 shown in FIG. 3 is a block diagram for an embodiment of the present disclosure. Each component of the block diagram may be integrated, added, or omitted depending on the specifications of the control unit 170 that is actually implemented.

In particular, the frame rate converter 350 and the formatter 360 may not be provided within the control unit 170, but may be provided separately or as a single module.

Figure 4:
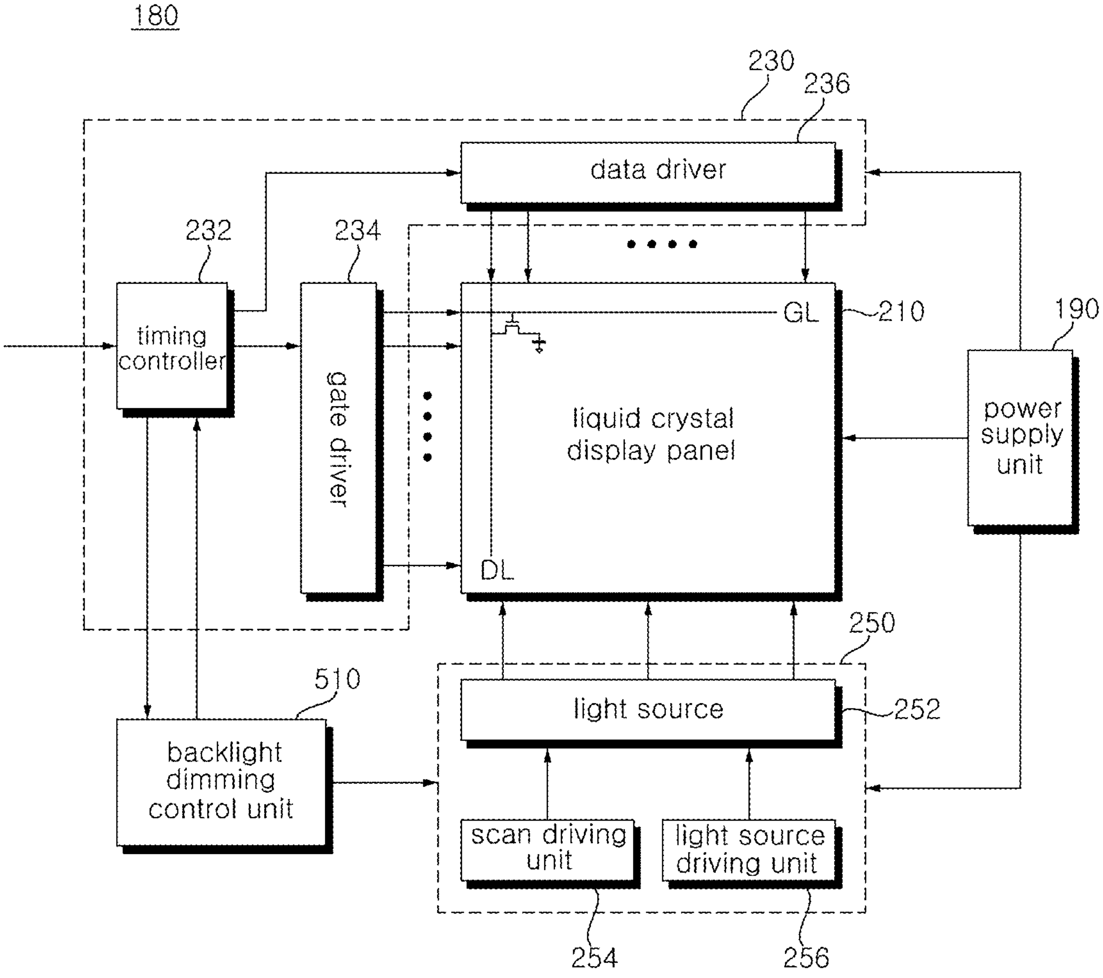
FIG. 4 is a block diagram of the inside of the power supply and the display of FIG. 2.

FIG. 4 is an internal block diagram of the display unit of FIG. 2.

Referring to the drawing, the display module 180 based on a liquid crystal display panel (LCD panel) may include a liquid crystal display panel 210, a driving circuit unit 230, a backlight unit 250, and a backlight dimming control unit 510.

In order to display an image, a plurality of gate lines (GL) and data lines (DL) are intersected in a matrix form, and the liquid crystal display panel 210 may include a first substrate a thin film transistor and a pixel electrode connected to it are formed in the intersecting area, a second substrate provided with a common electrode, and a liquid crystal layer formed between the first substrate and the second substrate.

The driving circuit unit 230 drives the liquid crystal display panel 210 through control signal and data signal supplied from the control unit 170 of FIG. 1. To this end, the driving circuit unit 230 includes a timing controller 232, a gate driver 234, and a data driver 236.

The timing controller 232 receives a control signal, R, G, B data signals, vertical synchronization signal (Vsync), etc. from the control unit 170, and controls the gate driver 234 and the data driver 236 in response to the control signal and rearranges the R, G, and B data signals to provide to the data driver 236.

Under the control of the gate driver 234, data driver 236, and timing controller 232, scanning signal and image signal are supplied to the liquid crystal display panel 210 through the gate line (GL) and data line (DL).

The backlight unit 250 supplies light to the liquid crystal display panel 210. To this end, the backlight unit 250 may include a light source 252, a scan driving unit 254 that controls the scanning drive of the light source 252, and a light source driving unit 256 that turns on/off the light source 252.

With the light transmittance of the liquid crystal layer adjusted by the electric field formed between the pixel electrode and the common electrode of the liquid crystal display panel 210, a predetermined image is displayed using light emitted from the backlight unit 250.

The power supply unit 190 may supply a common electrode voltage (Vcom) to the liquid crystal display panel 210 and a gamma voltage to the data driver 236. Additionally, driving power for driving the light source 252 may be supplied to the backlight unit 250.

Meanwhile, the backlight unit 250 may be divided into a plurality of blocks and driven. The controller 170 may control the display 180 to perform local dimming by setting a dimming value for each of the plurality of blocks. Specifically, the timing controller 232 outputs input image data (RGB) to the backlight dimming control unit 510, and the backlight dimming control unit 510 may calculate the dimming value of each of the plurality of blocks based on the input image data (RGB) received from the timing controller 232.

Figure 5:
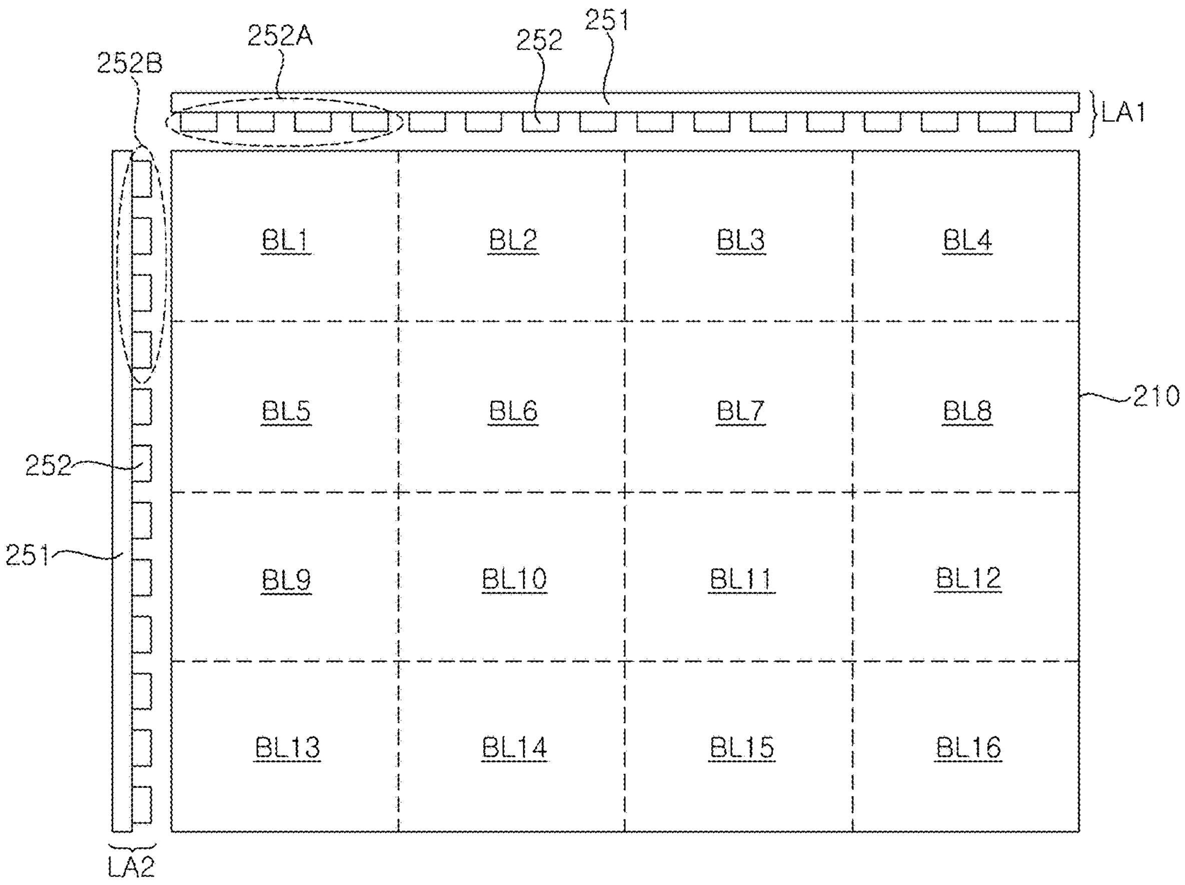
FIG. 5 is an example diagram showing the arrangement of a liquid crystal display panel and light sources in the case of an edge-type backlight unit.
Figure 6:
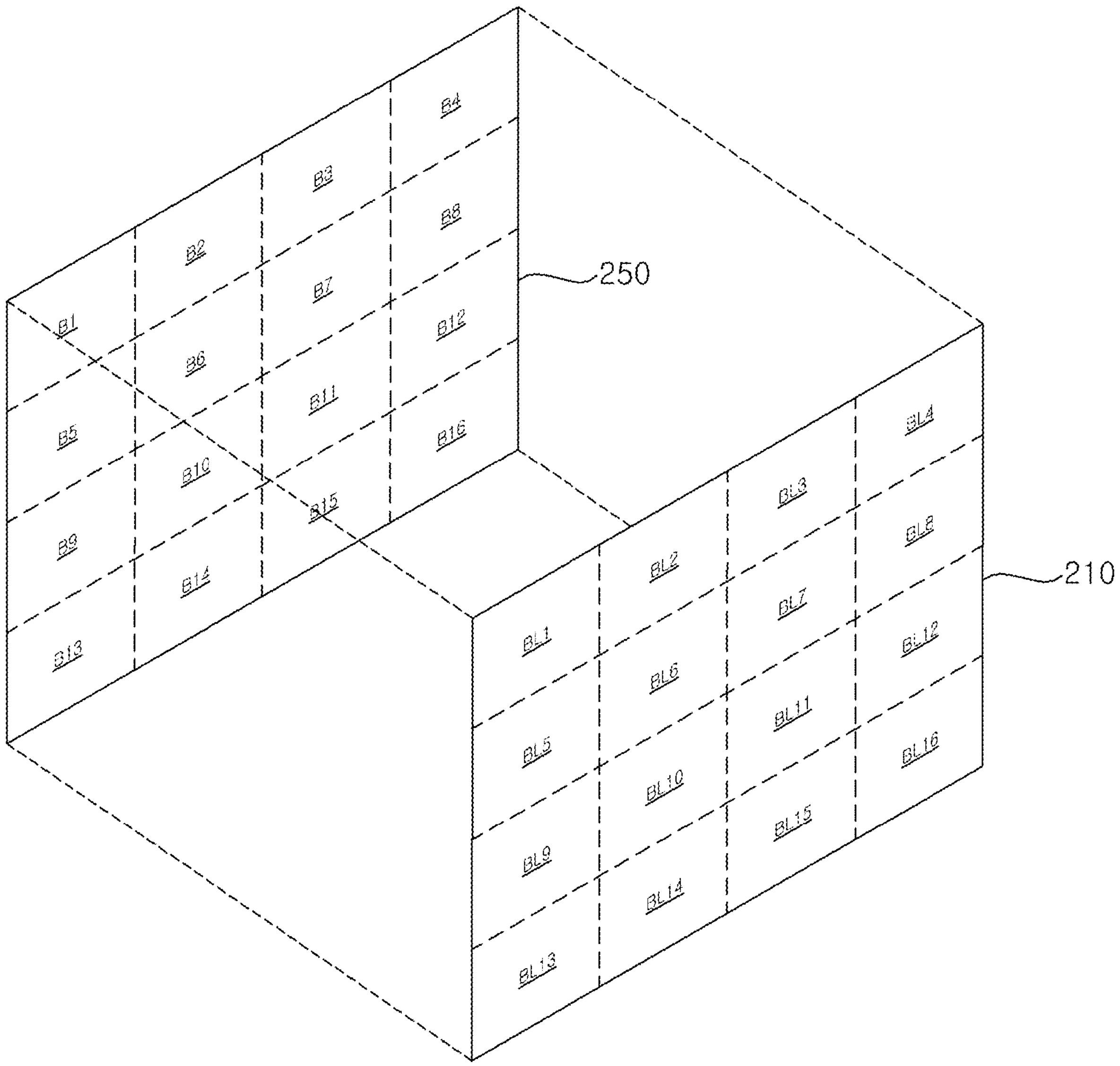
FIG. 6 is an example showing arrangement of a liquid crystal display panel and light sources in a direct-type backlight unit.

FIG. 5 is an example diagram showing the arrangement of a liquid crystal display panel and light sources in the case of an edge-type backlight unit, and FIG. 6 is an example diagram showing the arrangement of a liquid crystal display panel and light sources in the case of a direct-type backlight unit.

The liquid crystal display panel 210 may be divided into a plurality of virtual blocks as shown in FIGS. 5 and 6. FIGS. 5 and 6 illustrate that the liquid crystal display panel 210 is equally divided into 16 blocks BL1 to BL16, but it should be noted that the display is not limited thereto. Each of the plurality of blocks may include a plurality of pixels.

The backlight unit 250 may be implemented as either an edge type or a direct type.

The edge-type backlight unit 250 has a structure in which a plurality of optical sheets and a light guide plate are stacked below the liquid crystal display panel 210, and a plurality of light sources are disposed on the sides of the light guide plate.

When the backlight unit 250 is implemented as an edge-type backlight unit, light sources are disposed on at least one of the upper and lower sides and at least one of the left and right sides of the liquid crystal display panel 210. In FIG. 5, the first light source array LA1 is disposed on the upper side of the liquid crystal display panel 210, and the second light source array LA2 is disposed on the left side of the liquid crystal display panel 210. Each of the first and second light source arrays LA1 and LA2 includes a plurality of light sources 252 and a light source circuit board 251 on which the plurality of light sources 252 are mounted. In this case, the brightness of the light incident on the first block BL1 of the liquid crystal display panel 210 may be adjusted using the light sources 252A of the first light source array LA1 disposed at a position corresponding to the first block BL1 of the liquid crystal display panel 210 and the light sources 252B of the second light source array LA2.

The direct backlight unit 250 has a structure in which a plurality of optical sheets and a diffusion plate are stacked below the liquid crystal display panel 210 and a plurality of light sources are arranged below the diffusion plate.

When the backlight unit 250 is implemented as a direct backlight unit, it is divided to correspond one-to-one to the blocks BL1 to BL16 of the liquid crystal display panel 210, as shown in FIG. 6. In this case, the brightness of the light incident on the first block BL1 of the liquid crystal display panel 210 may be adjusted using the light sources 252 included in the block B1 of the backlight unit 250 disposed at a position corresponding to the first block BL1 of the liquid crystal display panel 210.

The light sources 252 may be implemented as point light sources such as light emitting diodes (LEDs). The light sources 252 are turned on and off by receiving light source driving signal (LDS) from the light source driving unit 256. The light intensity of the light sources 252 may be adjusted according to the amplitude of the light source driving signal (LDS), and the lighting period may be adjusted according to the pulse width. The brightness of light output from the light sources 252 may be adjusted according to the light source driving signal (LDS).

The light source driving unit 256 may generate light source driving signal (LDS) based on the dimming value of each block input from the backlight dimming control unit 510 and output them to the light source 252. The dimming value of the block is a value for implementing local dimming and may be the brightness of light output from the light sources 252.

Hereinafter, RGB data may include R data provided to the red subpixel, G data provided to the green subpixel, and B data provided to the blue subpixel.

Additionally, the voltage level of RGB data may represent the voltage level of data provided to any one of the red subpixel, green subpixel, or blue subpixel.

Figure 7:
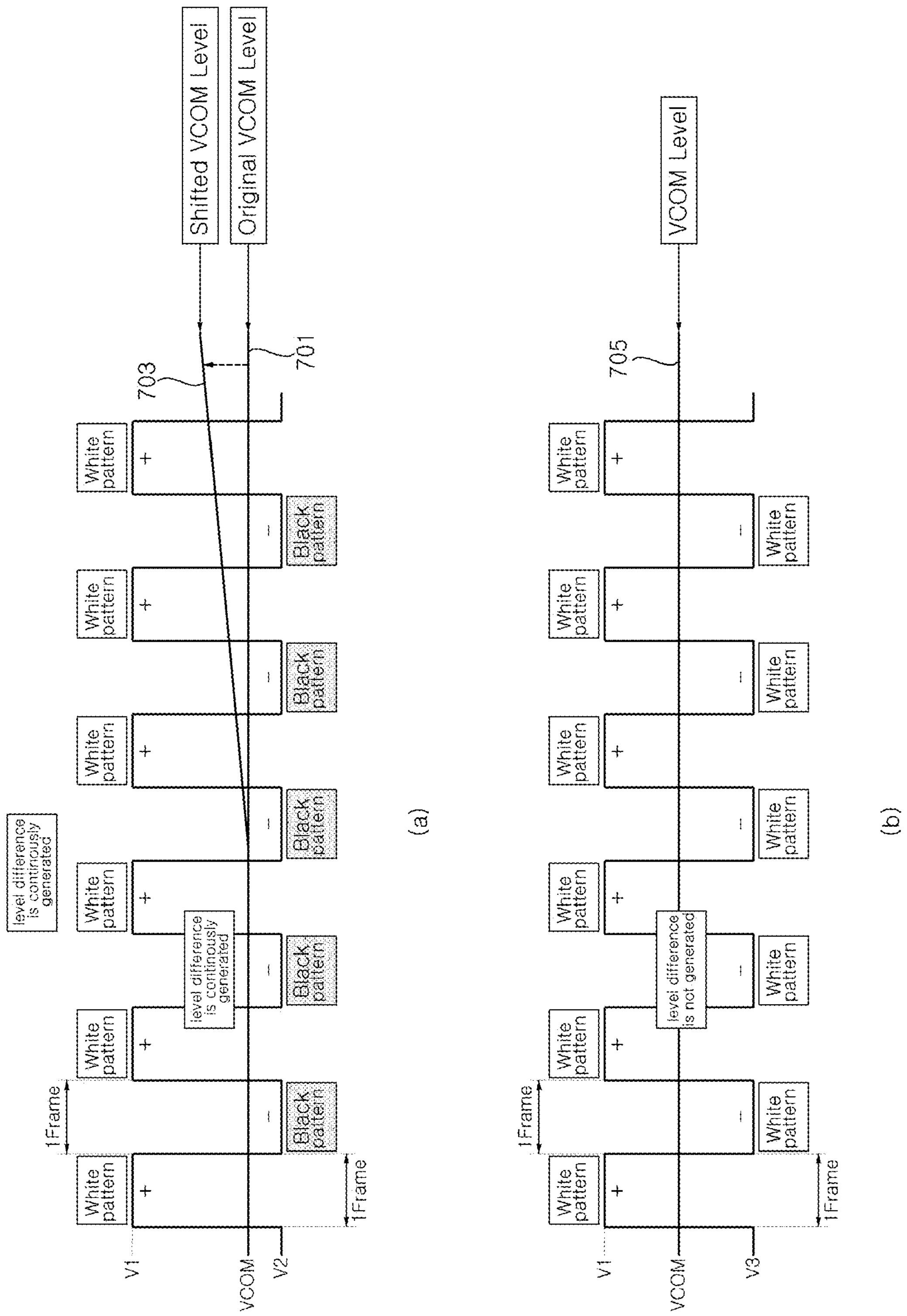
FIG. 7 is a diagram illustrating a process in which the common voltage level of RGB data is shifted in a logo or boundary displayed on the screen.

FIG. 7 is a diagram illustrating a process in which the common voltage level of RGB data is shifted in a logo or boundary displayed on the screen.

FIG. 7(*a*) is a diagram illustrating the process by which the common voltage level of RGB data changes over time in a logo image or boundary displayed on the screen of an LCD panel, and FIG. 7(*b*) is a diagram illustrating the process in which the common voltage level of RGB data does not change over time in a normal image.

The common voltage level (VCOM) may be a standard level for the voltage of RGB data.

The common voltage level (VCOM), a positive voltage level, and a negative voltage level to be described below may be expressed as a voltage value representing any one value between 0 and 255.

The negative voltage level means that it is smaller than the common voltage level (VCOM) and may not have an actual negative value.

The voltage level of RGB data may repeat a positive voltage level (V1) corresponding to a white pattern and a negative voltage level (V2) corresponding to a black pattern based on the common voltage level (VCOM).

The voltage of RGB data uses different polarities for each frame to prevent shifting (or charging) of the common voltage level (VCOM).

That is, voltage of different polarities may be applied to the pixel electrode of the LCD panel.

Each level of the positive voltage level (V1) corresponding to the white pattern and the negative voltage level (V2) corresponding to the black pattern may be maintained for one frame.

However, when an image pattern (for example, a program logo or a fixed boundary surface) in which a luminance difference between frames occurs is maintained, a phenomenon in which the common voltage level is shifted occurs, as shown in FIG. 7(*a*).

Referring to FIG. 7(*a*), the magnitude of the positive voltage level V1 of RGB data may be larger than the magnitude of the negative voltage level V2. When this pattern is repeated, a level difference is continuously generated, and the initial common voltage level VCOM may be shifted from the first line 701 to the second line 703 inclined to the positive voltage level V1.

In contrast, referring to FIG. 7(*b*), when a normal image pattern in which no luminance difference occurs between frames is output, the common voltage level (VCOM) is maintained constant. That is, based on the common voltage level (VCOM), there is no level difference between the positive voltage level (V1) corresponding to the white pattern and the negative voltage level (V3) corresponding to the black pattern.

As shown in FIG. 7(*a*), a polarity toggle operation that inverts the positive and negative voltage levels may be performed to prevent the common voltage level (VCOM) from shifting.

That is, the polarity toggle operation may be an operation to invert the polarity of the voltage level of RGB data.

Figure 8:
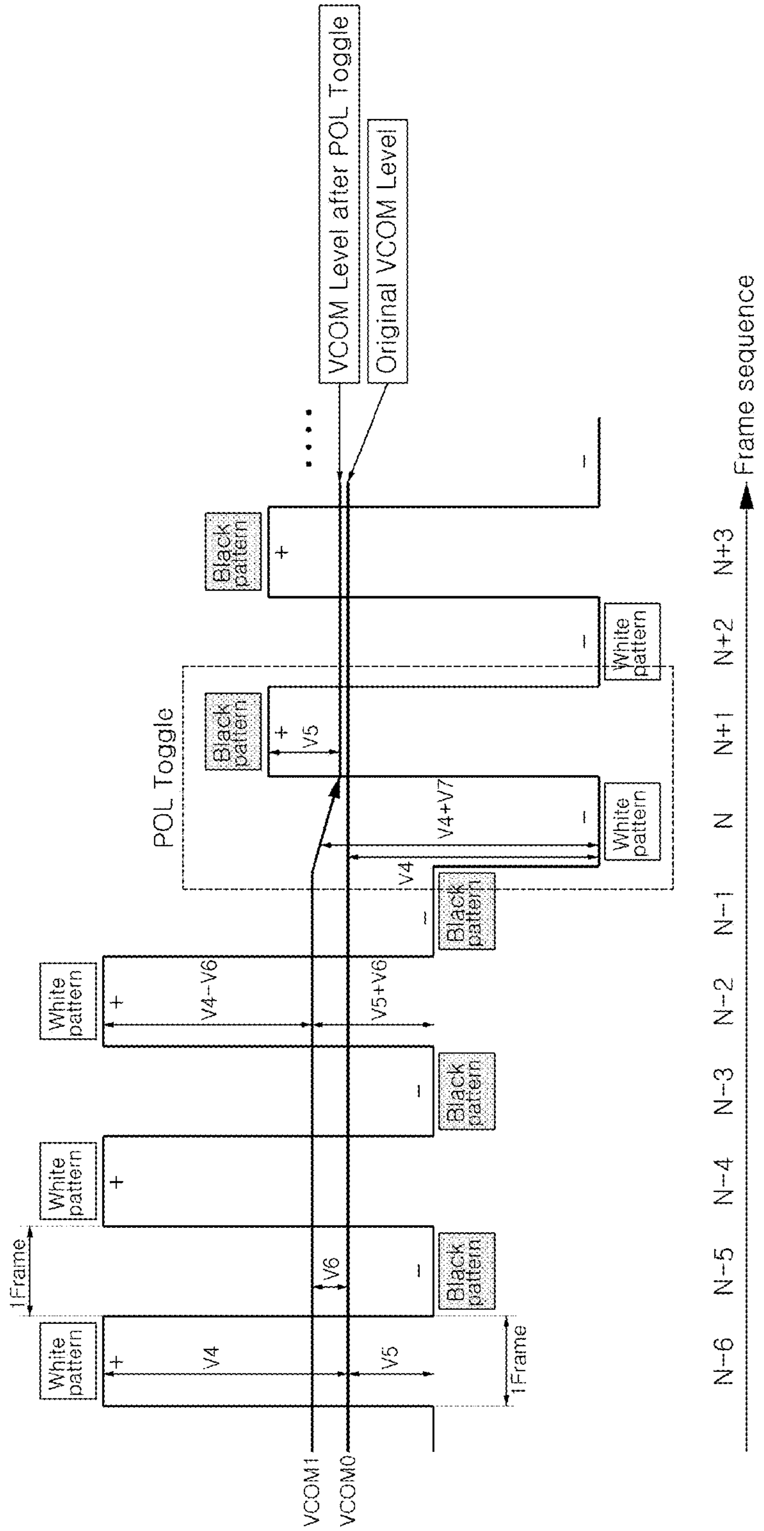
FIG. 8 is a diagram illustrating a polarity toggle operation that inverts the positive voltage level and negative voltage level to prevent the common voltage level (VCOM) from shifting.

FIG. 8 is a diagram illustrating a polarity toggle operation that inverts the positive and negative voltage levels to prevent the common voltage level (VCOM) from shifting.

The polarity toggle operation may be an operation to stabilize the common voltage level.

Referring to FIG. 8, as shown in FIG. 7(*a*), it shows a state in which the common voltage level is changed from VCOM0 to VCOM1 due to a program logo or a fixed boundary surface.

Based on the initial common voltage level of VCOM0, it is assumed that the positive voltage level is V4 and the negative voltage level is V5.

The positive voltage level decreases to V4−V6, excluding V6(VCOM1−VCOM0), which is the difference caused by the shift in the common voltage level from V4, and the negative voltage level increases to V5+V6, summing of V6 (VCOM1−VCOM0), which is the difference caused by the shift in the common voltage level from V5.

As the initial common voltage level VCOM0 increases to the shifted common voltage level VCOM1, the brightness of the frame of the white pattern becomes darker as the positive voltage level of the white pattern decreases from V4 to V4−V6, and the brightness of the frame of the black pattern becomes brighter as the negative voltage level of the black pattern increases from V5 to V5+V6.

Accordingly, normal image cannot be output on the LCD panel.

The display device 100 may perform a polarity toggle operation to eliminate the phenomenon in which the initial common voltage level VCOM0 shifts. The polarity toggle operation may be an operation that inverts the positive voltage level corresponding to the white pattern and the negative voltage level corresponding to the black pattern.

Referring to FIG. 8, the display device 100 may perform a polarity toggle operation at regular interval.

The display device 100 may start a polarity toggle operation for the Nth frame. As originally planned, for the Nth frame, a positive voltage level V4 corresponding to the white pattern should be output to the LCD panel based on the initial common voltage level VCOM0.

However, the display device 100 may output a negative voltage level having a magnitude of V4 based on the initial common voltage level VCOM0 according to a polarity toggle operation in the Nth frame corresponding to the white pattern.

In addition, as originally planned, for the N+1th frame corresponding to the black pattern, a negative voltage level V5 should be output to the LCD panel based on the initial common voltage level VCOM0.

However, the display device 100 may output a positive voltage level V5 to the LCD panel based on the initial common voltage level VCOM0 according to a polarity toggle operation in the N+1th frame of the black pattern.

In this way, a polarity toggle operation is performed to remove the state in which the initial common voltage level VCOM0 of the RGB data is shifted to VCOM1. When a polarity toggle operation is performed, the shifted common voltage level VCOM1 may be re-shifted to the initial common voltage level VCOM0 (or a value close to VCOM0) within a section corresponding to the N-th frame.

However, the negative voltage level of the Nth frame corresponding to the white pattern may be V4+V7, which is the sum of V4 based on the initial common voltage level VCOM0 and V7, which is ½ of the difference between VCOM1 and VCOM0. Here, ½ of the difference between VCOM1 and VCOM0 is just an example. V7 may be a level within the difference between VCOM1 and VCOM0.

The positive voltage level of the N−2th frame corresponding to the previous white pattern is V4−V6, and the negative voltage level of the Nth frame corresponding to the following white pattern is V4+V7. That is, the voltage level of the frame corresponding to the white pattern may increase from V4−V6 to V4+V7.

Additionally, the negative voltage level of the N−1th frame corresponding to the previous black pattern is V5+V6, and the positive voltage level of the N+1th frame corresponding to the following black pattern is V5. That is, the voltage level of the frame corresponding to the black pattern may be reduced from V5+V6 to V5.

For the section of the N+1 frame corresponding to the black pattern, the shifted common voltage level VCOM1 may be re-shifted to the initial common voltage level VCOM0.

In this way, as the voltage level applied to the N-th frame increases due to the polarity toggle operation, the brightness of the N-th frame becomes brighter, and as the voltage level applied to the N+1-th frame decreases, the brightness of the N+1-th frame becomes darker. Accordingly, flickering may occur in the N-th frame and N+1-th frame.

In an embodiment of the present disclosure, an attempt is made to improve flicker that occurs when a polarity toggle operation is performed by adjusting the voltage level of RGB data at the time of the polarity toggle operation.

Figure 9:
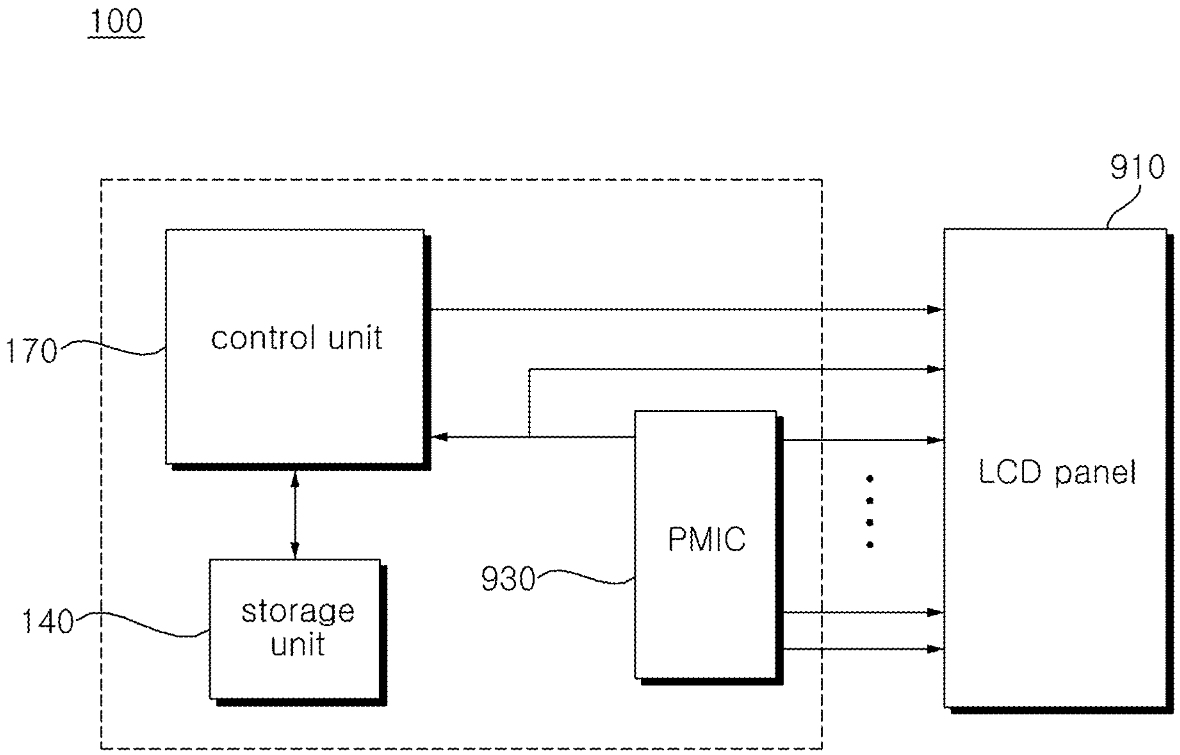
FIG. 9 is a block diagram illustrating the configuration of a display device according to another embodiment of the present disclosure.

FIG. 9 is a block diagram explaining the configuration of a display device according to another embodiment of the present disclosure.

Referring to FIG. 9, the display device 100 may include a storage unit 140, a control unit 170, a power management integrated circuit (PMIC) 930, and an LCD panel 910.

The storage unit 140 may perform the functions of the storage unit 140 described in FIG. 2.

The control unit 170 may perform the functions of the control unit 170 described in FIG. 2.

The PMIC 930 may manage the power of the display device 100. PMIC 930 may be included in the power supply unit 190 of FIG. 2.

The PMIC 930 may supply power to the LCD panel 910 according to the various power requirements of the LCD panel 910 and manage the power supplied to the LCD panel 910.

The PMIC 930 may read the common voltage level from the LCD panel 910. The PMIC 930 may read the initial common voltage level when the LCD panel 910 is turned on and the common voltage level periodically after the power is turned on.

The PMIC 930 may provide gamma voltage to a backlight unit (not shown) or a data driver (not shown) connected to the LCD panel 910 to adjust screen brightness and color.

The control unit 170, storage unit 140, and PMIC 930 may constitute the main board.

The control unit 170 may be implemented in the form of a system on chip (SoC).

The LCD panel 910 may be the panel 210 shown in FIG. 4.

The control unit 170 may read the initial common voltage level of the RGB data from the PMIC 930 and store the read initial common voltage level in the storage unit 140.

The common voltage level of RGB data may be read from the PMIC 930 at regular intervals.

The control unit 170 may compare the initial common voltage level stored in the storage unit 140 with the read common voltage level.

As a result of the comparison, the control unit 170 may determine whether the common voltage level has changed more than a certain ratio compared to the initial common voltage level.

If it is determined that the change has occurred more than a certain ratio, the controller 170 may obtain the average picture level (APL) difference or luminance difference of the two frames before the polarity toggle operation.

The control unit 170 may obtain a gain value and an offset value of the voltage level of the RGB data corresponding to the difference value of the APL.

The control unit 170 may apply a gain value and an offset value for the voltage level of RGB data to two frames at the time of the polarity toggle operation according to the polarity toggle operation.

The control unit 170 may apply the adjusted voltage level of RGB data to the LCD panel 930.

The control unit 170 may apply a negative voltage level reduced by the offset value of the RGB data and a positive voltage level increased by the gain value of the RGB data to the pixel electrode of the LCD panel 930.

Meanwhile, if it is determined that the common voltage level has not changed by more than a certain ratio compared to the initial common voltage level, the control unit 170 may perform a polarity toggle operation on the voltage level of the RGB data in accordance with the polarity toggle operation cycle.

Figure 10:
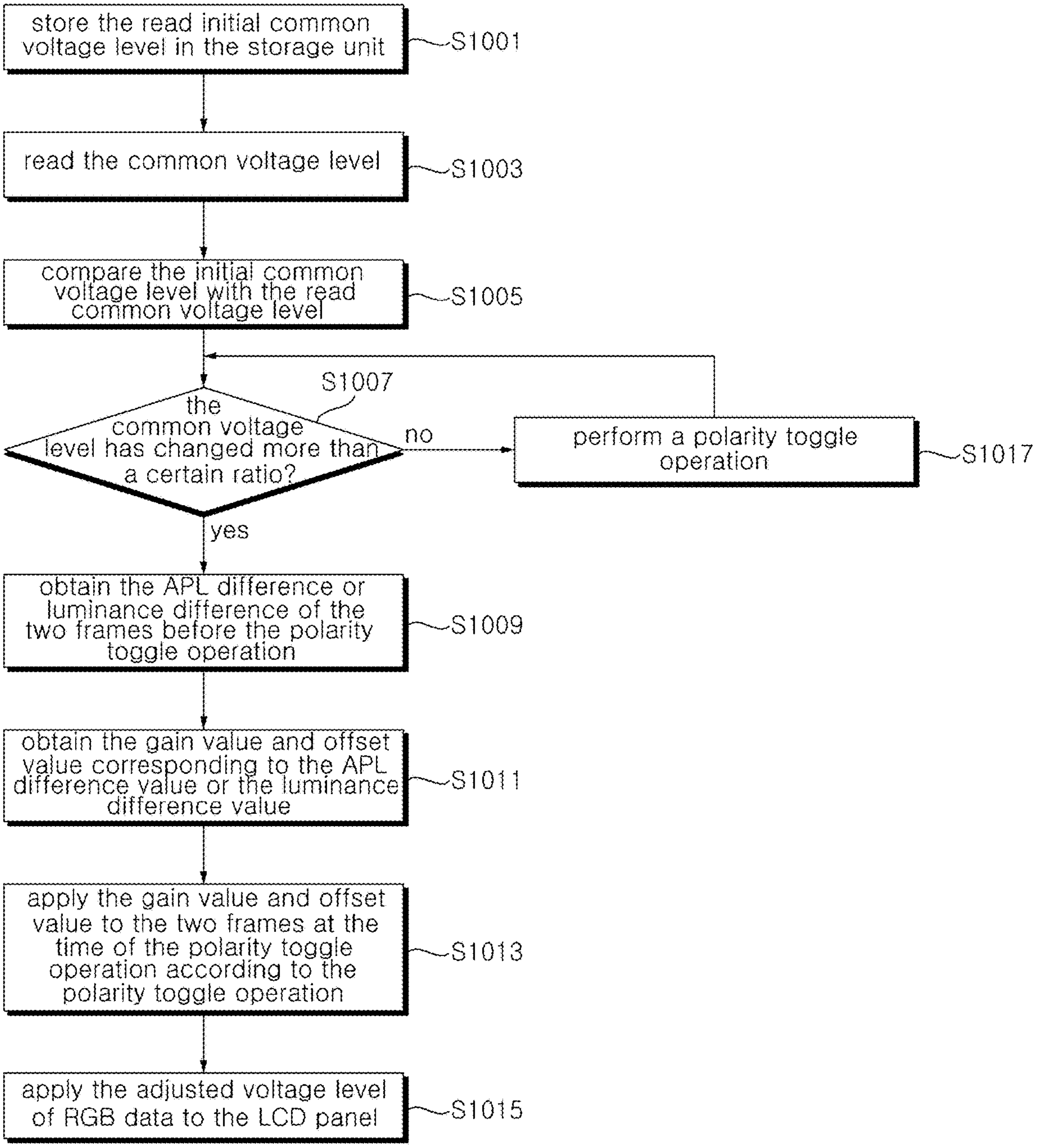
FIG. 10 is a flowchart for explaining a method of operating a display device according to an embodiment of the present disclosure.

FIG. 10 is a flowchart for explaining a method of operating a display device according to an embodiment of the present disclosure.

Referring to FIG. 10, the control unit 170 of the display device 100 may read the initial common voltage level of RGB data from the PMIC 930 and store the read initial common voltage level in the storage unit 140 (S1001).

In one embodiment, when the display device 100 or the LCD panel 910 is turned on, the control unit 170 may read the initial common voltage from the PMIC 930 through an analog digital converter (ADC) input port provided in the control unit 170.

The PMIC 930 may obtain the initial common voltage level and transmit the obtained initial common voltage level to the control unit 170.

The control unit 170 may store the initial common voltage level received from the PMIC 930 in the storage unit 140.

The control unit 170 may read the common voltage level of RGB data at a certain period from the PMIC 930 (S1003).

The certain period may be one of 5 minutes, 10 minutes, or 30 minutes, but this is only an example.

The PMIC 930 may read the common voltage level of the RGB data at the certain period from the LCD panel 930 and transmit the common voltage level of the read RGB data to the control unit 170.

The control unit 170 may periodically obtain the common voltage level of the RGB data to determine how much the read common voltage level has changed compared to the initial common voltage level.

The control unit 170 may compare the initial common voltage level stored in the storage unit 140 with the read common voltage level (S1005).

As a result of the comparison, the control unit 170 may determine whether the common voltage level has changed more than a certain ratio compared to the initial common voltage level (S1007).

In one embodiment, the certain ratio may be +5% or −5%, but this is only an example. For example, if the initial common voltage level is 8V and the common voltage level read later is less than 7.6V and greater than 8.4V, the control unit 170 may determine that the common voltage level has changed more than the certain ratio compared to the initial common voltage level.

If it is determined that the change is more than the certain ratio, the control unit 170 may obtain difference value of the average picture level (APL) or difference value of luminance of the two frames before the polarity toggle operation (S1009).

If it is determined that the change occurs more than the certain ratio, the control unit 170 may measure the APL of each of the two frames before the polarity toggle operation.

The control unit 170 may measure the APL of the frame through the following [Equation 1].

$$APL(\%) = \frac{\text{SUM}\{\text{Max.}(R, G, B)/255\}}{\text{total number of pixels}} \times 100 \quad \text{[Equation 1]}$$

R means a red data, G means green data, and B means blue data. Max(R, G, B) is the maximum value among R, G, and B, and SUM{Max(R, G, B)} is the sum of the maximum values among R, G, and B. Image with a large number of bright pixel data have a large APL. On the other hand, an image with a small number of bright pixel data has a small APL.

The control unit 170 may measure the APLs of two frames before the polarity toggle operation that inverts the positive voltage level and the negative voltage level, and obtain a difference value between the measured APLs.

If it is determined that the change occurs more than the certain ratio, the control unit 170 may measure the luminance of each of the two frames before the polarity toggle operation. The control unit 170 may measure the luminance of each of the two frames through a brightness sensor or an optical sensor provided on the front of the LCD panel 910.

The controller 170 may measure the luminance of two frames before a polarity toggle operation that inverts the positive and negative voltage levels, and obtain a difference value between the measured luminances.

The control unit 170 may obtain the gain value and offset value of the voltage level of the RGB data corresponding to the APL difference value or the luminance difference value (S1011).

The gain value of the voltage level of the RGB data may be a value added to the positive voltage level whose polarity is inverted by a polarity toggle, and the offset value may be a value subtracted from the negative voltage level whose polarity is inverted.

The control unit 170 may obtain gain values and offset values to improve flicker that occurs in two frames according to the polarity toggle operation.

Before the polarity toggle operation, the control unit 170 may obtain the gain value and offset value using a lookup table that corresponds the APL difference value of the two frames and the gain value/offset value of the voltage level of the RGB data.

The lookup table may be previously stored in the storage unit 140.

FIG. 11 is a diagram illustrating a lookup table that corresponds to a luminance difference value and a gain value/offset value of a voltage level of RGB data according to an embodiment of the present disclosure.

Referring to FIG. 11, a lookup table 1100 is shown that corresponds the luminance difference value of two frames and the gain/offset value of the voltage level of RGB data before the polarity toggle operation.

The lookup table 1100 may apply an APL value instead of a luminance difference value.

In FIG. 11, frames N−2 and N−1 may represent two frames before the polarity toggle operation.

The lookup table 1110 may include three sub-tables 1110, 1130, and 1150 that define gain value and offset value according to the range of luminance difference value.

When the luminance difference value between the N−2 and N−1 frames is more than 50 nit and less than 100 nit, the first sub table 1110 may define a gain value and an offset value matching the voltage level of the RGB data.

For example, if the positive voltage level of RGB data for N−2 frame ranges from 208 to 223 levels, the offset value may be 8 level, and if the negative voltage level of RGB data for N−2 frames ranges 80 to 95 levels, the gain value may be 6 level.

When the luminance difference value between the N−2 and N−1 frames is more than 100 nit and less than 200 nit, the second sub table 1130 may define a gain value and an offset value matching the voltage level of the RGB data.

When the luminance difference between the N−2 and N−1 frames is more than 200 nit, the third sub table 1150 may define a gain value and an offset value that match the voltage level of the RGB data.

Again, FIG. 10 will be described.

The control unit 170 may apply the gain value and offset value for the voltage level of the RGB data to the two frames at the time of the polarity toggle operation according to the polarity toggle operation (S1013).

The control unit 170 may invert the positive voltage level of the RGB data to a negative voltage level and invert the negative voltage level of the RGB data to a positive voltage level according to the polarity toggle operation.

The controller 170 may subtract an offset value from the inverted negative voltage level of the frame corresponding to the white pattern and add a gain value to the inverted positive voltage level of the frame corresponding to the black pattern.

Figure 12:
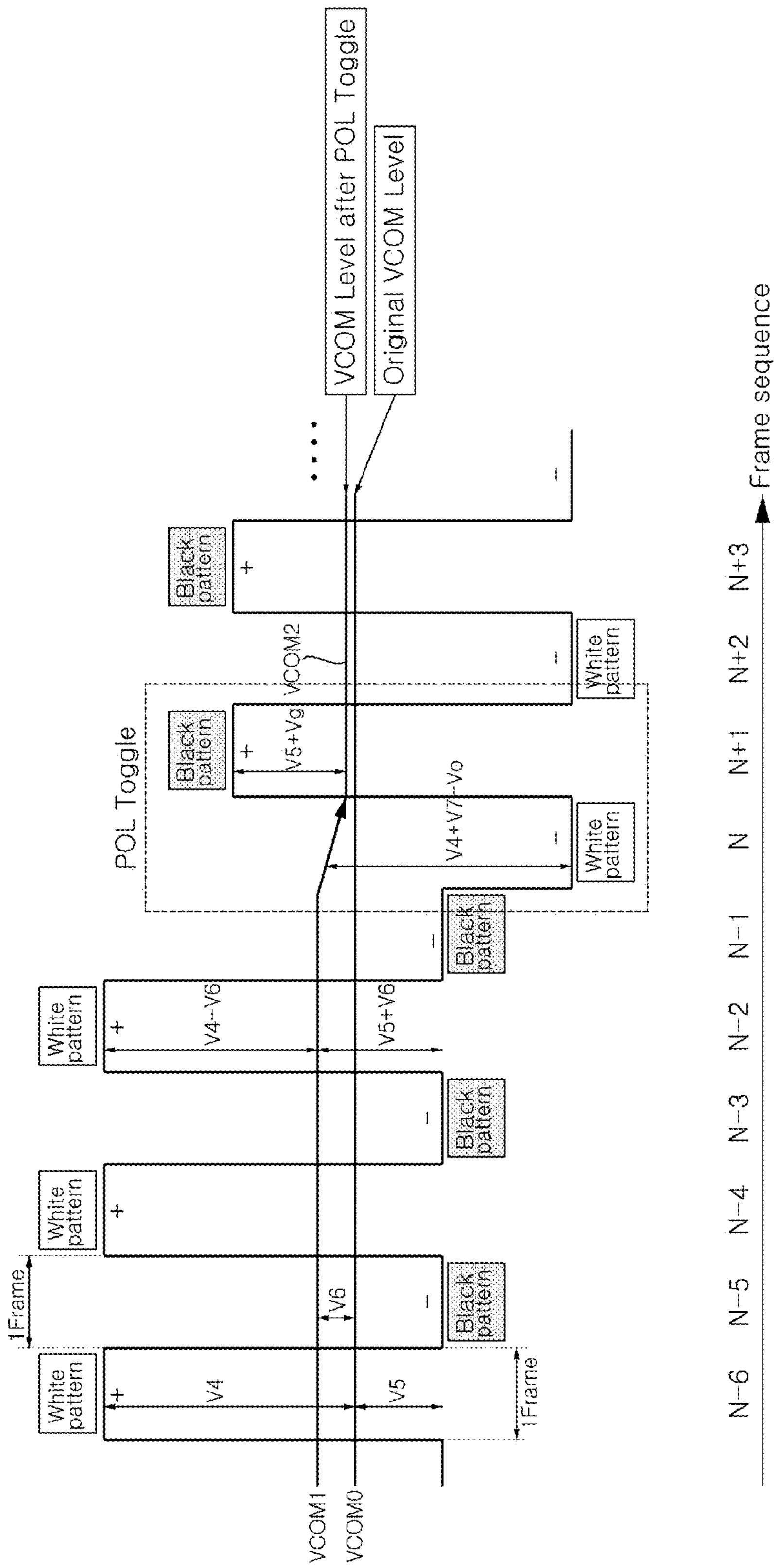
FIG. 12 is a diagram illustrating the result of applying a gain value and an offset value for the voltage level of RGB data to two frames at the time of a polarity toggle operation according to an embodiment of the present disclosure.

FIG. 12 is a diagram illustrating the results of applying a gain value and an offset value for the voltage level of RGB data to two frames at the time of a polarity toggle operation according to an embodiment of the present disclosure.

FIG. 12 is a diagram illustrating the result of applying an offset value to the inverted negative voltage level of RGB data and applying a gain value to the inverted positive voltage level of RGB data when performing the polarity toggle operation of FIG. 8.

Referring to FIG. 12, during a polarity toggle operation, the controller 170 may subtract the offset value Vo from the negative voltage level V4+V7 corresponding to the N frame of the existing white pattern. Accordingly, the negative voltage level corresponding to the N frame may be reduced from V4+V7 to V4+V7−Vo.

The control unit 170 may obtain an offset value Vo matching the luminance difference value between the N−2 frame and the N−1 frame through the lookup table 1100 of FIG. 11, and subtract the obtained offset value from the inverted negative voltage level.

During the polarity toggle operation, the control unit 170 may subtract the gain value Vg from the positive voltage level V5 corresponding to the N+1 frame of the existing black pattern. Accordingly, the positive voltage level corresponding to the N+1 frame may be increased from V5 to V5+Vg.

The control unit 170 may obtain a gain value Vg matching the luminance difference value between the N−2 frame and the N−1 frame through the lookup table 1100 of FIG. 11, and subtract the obtained gain value from the inverted positive voltage level.

In this way, due to the application of the offset value during the polarity toggle operation, the negative voltage level of the N-th frame is reduced compared to the existing state, so the brightness of the N-th frame may become less bright.

Likewise, as the positive voltage level of the N+1-th frame increases compared to the previous one due to the application of a gain value during a polarity toggle operation, the brightness of the N+1-th frame may become less dark.

Accordingly, the flicker phenomenon may be improved in the N-th frame and N+1-th frame.

Again, FIG. 10 will be described.

The control unit 170 may apply the adjusted voltage level of RGB data to the LCD panel 930 (S1015).

The control unit 170 may apply a negative voltage level reduced by the offset value of the RGB data and a positive voltage level increased by the gain value of the RGB data to the pixel electrode of the LCD panel 930.

The control unit 170 may transmit the adjusted voltage level of RGB data to the data driver connected to the LCD panel 930.

Meanwhile, if it is determined that the common voltage level has not changed by more than the certain ratio compared to the initial common voltage level, the control unit 170 may perform a polarity toggle operation on the voltage level of the RGB data in accordance with the polarity toggle operation cycle (S1017).

Figure 13:
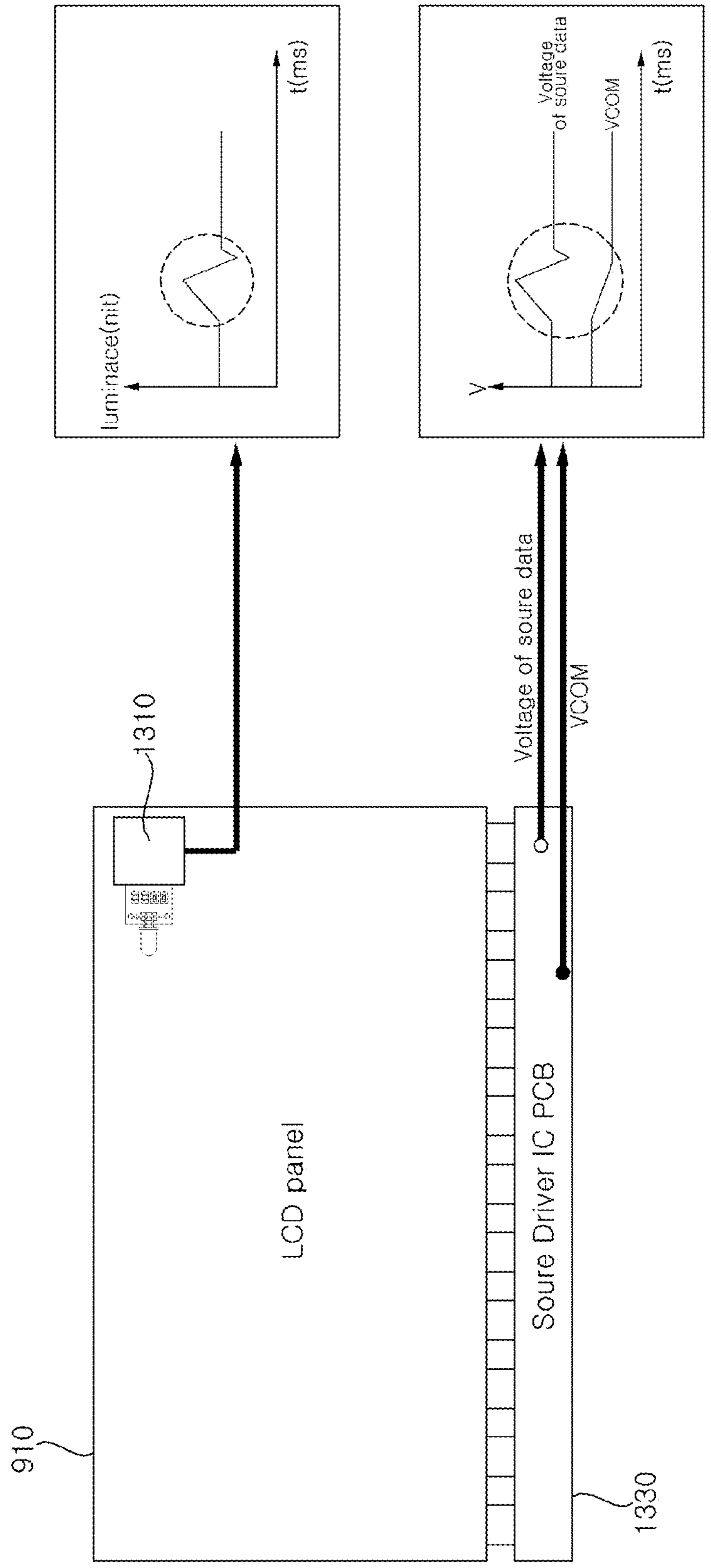
FIG. 13 is a diagram illustrating a method for checking whether an embodiment of the present disclosure is applied.

FIG. 13 is a diagram illustrating a method for checking whether an embodiment of the present disclosure is applied.

First, a frame pattern with a large difference in luminance may be applied to the LCD panel 910. For example, frame corresponding to a white pattern and frame corresponding to a black pattern may be repeatedly input to the LCD panel 910.

A photo diode module 1310 capable of checking the amount of change in luminance may be attached to the front of the LCD panel 910. The photo diode module 1310 may measure the amount of change in luminance at the point of a polarity toggle operation.

The user may measure the common voltage level (VCOM) and the voltage of the source data transmitted by the source driver integrated circuit to the LCD panel 910 through a probe on the PCB 1330 equipped with the source driver integrated circuit connected to the LCD panel 910. Source data may be RGB data.

If the amount of luminance change measured through the photo diode module 1310 at the point of polarity toggle is large, it may be determined that the embodiment of the present disclosure for improving flicker has not been applied, and if the amount of luminance change measured through the photo diode module 1310 at the point of polarity toggle is small, it may be determined that the embodiment of the present disclosure for improving flicker has not been applied.

That is, when applied to the embodiment of the present disclosure, after the polarity toggle operation, the rate of change in luminance becomes smaller than before application of the embodiment of the present disclosure.

Additionally, after the polarity toggle operation, as the common voltage level is reduced to become closer to the initial common voltage level, the amount of change in the voltage level of the source data for the two frames becomes smaller than before application of the embodiment of the present disclosure.

In this way, application of the present disclosure may be confirmed based on the amount of change in luminance measured in the photo diode module 1310, the common voltage level measured in the source driver (or data driver) integrated circuit PCB, and the voltage of the source data.

A device display device according to an embodiment of the present disclosure, comprises a Liquid Crystal Display (LCD) panel and a control unit configured to compare an initial common voltage level of RGB data applied to the LCD panel with a common voltage level obtained after the initial common voltage level, and when the common voltage level is changed more than a certain ratio compared to the initial common voltage level, adjust a voltage level of the RGB data applied to two frames at a time of a polarity toggle operation to invert the polarity of the voltage level of the RGB data.

The control unit 170 may obtain a luminance difference value between prior two frames before the time of the polarity toggle operation, obtain an offset value and a gain value corresponding to the obtained luminance difference value, apply an inverted negative voltage level to the offset value at the time of the polarity toggle operation and apply an inverted positive voltage level to the gain value at the time of the polarity toggle operation.

The control unit 170 may subtract the offset value from the inverted negative voltage level and add the gain value to the inverted positive voltage level.

The storage unit 140 may store a lookup table matching the offset value and the gain value corresponding to the luminance difference value, The control unit 170 may obtain the offset value and the gain value matching the luminance difference value from the lookup table.

The control unit 170 may, at the time of the polarity toggle operation, among the two frames, apply the offset value to a frame which the voltage level increases based on the shifted common voltage level, and apply a gain value to a frame which the voltage level decreases based on the shifted common voltage level.

The control unit 170 may apply the adjusted voltage level to a data driver connected to the LCD panel.

The display device 100 may further comprise the Power Management Integrated Circuit (PMIC, 930) that manages a power of the LCD panel, The control unit 170 may read the initial common voltage level and the common voltage level from the PMIC 930.

The polarity toggle operation may be an operation of inverting the positive voltage level of a frame corresponding to the white pattern to a negative voltage level, and inverting the negative voltage level of a frame corresponding to the black pattern to a positive voltage level.

A display device according to an embodiment of the present disclosure includes a liquid crystal display (LCD) panel 910, an initial common voltage level of RGB data applied to the LCD panel, and a common voltage obtained after the initial common voltage level. When the levels are compared and the common voltage level changes by a certain ratio or more compared to the initial common voltage level, the voltage level of the RGB data applied to two frames during a polarity toggle operation to invert the polarity of the voltage level of the RGB data It may include a control unit 170 that adjusts.

The control unit 170 acquires a luminance difference value between two frames before the point of the R polarity toggle operation, obtains an offset value and a gain value corresponding to the obtained luminance difference value, and inverts the polarity during the polarity toggle operation. The offset value may be applied to the inverted negative voltage level, and the gain value may be applied to the inverted positive voltage level.

The controller 170 may subtract the offset value from the inverted negative voltage level and add the gain value to the inverted positive voltage level.

The storage unit 140 may store a lookup table that matches the offset value and the gain value corresponding to the luminance difference value.

The controller 170 may obtain the offset value and the gain value matching the luminance difference value from the lookup table.

During a polarity toggle operation, the controller 170 may apply an offset value when the voltage level increases based on the shifted common voltage level among two frames, and apply a gain value when the voltage level decreases.

The control unit 170 may apply the adjusted voltage level to the data driver connected to the LCD panel.

The display device 100 may further include a PMIC 930 that manages power of the LCD panel 910, and the control unit 170 reads the initial common voltage level and the common voltage level from the PMIC 930.

The polarity toggle operation may be an operation of inverting the positive voltage level of the frame corresponding to the white pattern to a negative voltage level and inverting the negative voltage level of the frame corresponding to the black pattern to a positive voltage level.

The present disclosure described above may be implemented as computer-readable code on a program-recorded medium. Computer-readable media includes all types of recording devices that store data that may be read by a computer system. Examples of computer-readable media include HDD (Hard Disk Drive), SSD (Solid State Disk), SDD (Silicon Disk Drive), ROM, RAM, CD-ROM, magnetic tape, floppy disk, optical data storage device, etc. Additionally, the computer may include a control unit 170 of the display device 100. Accordingly, the above detailed description should not be construed as restrictive in all respects and should be considered illustrative.

What is claimed is:

1. A display device, comprising:

a Liquid Crystal Display (LCD) panel; and a controller configured to:

compare a first common voltage level of the LCD panel with a second common voltage level obtained after the first common voltage level, and based on a difference from the first common voltage level to the second common voltage level being greater than a certain threshold, obtain a luminance difference value between two preceding consecutive first frames, and based on the obtained luminance difference value, perform a polarity toggle operation for inverting a polarity of a voltage level corresponding to two consecutive second frames following the two preceding consecutive first frames by adjusting the voltage level corresponding to the two consecutive second frames.

2. The display device of claim 1, wherein the controller is further configured to:

obtain an offset value and a gain value corresponding to the obtained luminance difference value;

apply an inverted negative voltage level to the offset value at a time of the polarity toggle operation; and apply an inverted positive voltage level to the gain value at the time of the polarity toggle operation.

3. The display device of claim 2, wherein the controller is further configured to:

subtract the offset value from the inverted negative voltage level; and add the gain value to the inverted positive voltage level.

4. The display device of claim 3, further comprising:

a storage unit configured to store a lookup table matching the offset value and the gain value corresponding to the luminance difference value, wherein the controller is configured to obtain the offset value and the gain value matching the luminance difference value from the lookup table.

5. The display device of claim 2, wherein the controller is further configured to:

apply the offset value to a frame of the two consecutive second frames for which the voltage level increases based on the second common voltage level, and apply a gain value to a frame of the two consecutive second frames for which the voltage level decreases based on the second common voltage level.

6. The display device of claim 1, wherein the controller is further configured to:

apply the adjusted voltage level to a data driver connected to the LCD panel.

7. The display device of claim 1, further comprises:

a Power Management Integrated Circuit (PMIC) configured to manage a power of the LCD panel, wherein the controller is further configured to read the first common voltage level and the second common voltage level from the PMIC.

8. The display device of claim 1, wherein the polarity toggle operation comprises inverting a positive voltage level of a frame corresponding to a white pattern to a negative voltage level, and inverting a negative voltage level of a frame corresponding to a black pattern to a positive voltage level.

9. A method of operating a display device having a liquid crystal display (LCD) panel, comparing a first common voltage level of the LCD panel with a second common voltage level obtained after the first common voltage level; and based on a difference from the first common voltage level to the second common voltage level being greater than a certain threshold, obtaining a luminance difference value between two preceding consecutive first frames, and based on the obtained luminance difference value, perform a polarity toggle operation for inverting a polarity of a voltage level corresponding to two consecutive second frames following the two preceding consecutive first frames by adjusting the voltage level corresponding to the two consecutive second frames.

10. The method of claim 9, wherein the adjusting comprises:

obtaining an offset value and a gain value corresponding to the obtained luminance difference value;

applying the offset value to an inverted negative voltage level at a time of the polarity toggle operation; and applying the gain value to an inverted positive voltage level at the time of the polarity toggle operation.

11. The method of claim 10, wherein the applying the offset value to the inverted negative voltage level comprises:

subtracting the offset value from the inverted negative voltage level, wherein the gain value to the inverted positive voltage level comprises:

adding the gain value to the inverted positive voltage level.

12. The method of claim 11, further comprising:

storing a lookup table matching the offset value and the gain value corresponding to the luminance difference value, wherein the obtaining the offset value and the gain value comprises:

obtaining the offset value and the gain value matching the luminance difference value from the lookup table.

13. The method of claim 10, wherein the adjusting comprises:

applying the offset value to a frame of the two consecutive second frames for which the voltage level increases based on the second common voltage level, and applying a gain value to a frame of the two consecutive second frames for which the voltage level decreases based on the second common voltage level.

14. The method of claim 9, further comprising applying the adjusted voltage level to a data driver connected to the LCD panel.

15. The method of claim 9, further comprising reading the first common voltage level and the second common voltage level from a Power Management Integrated Circuit (PMIC) that manages power of the LCD panel.

* * * * *